July 30, 1929.   J. H. ROETHEL   1,722,824
AUTOMOBILE VENTILATING DEVICE
Filed Aug. 27, 1923
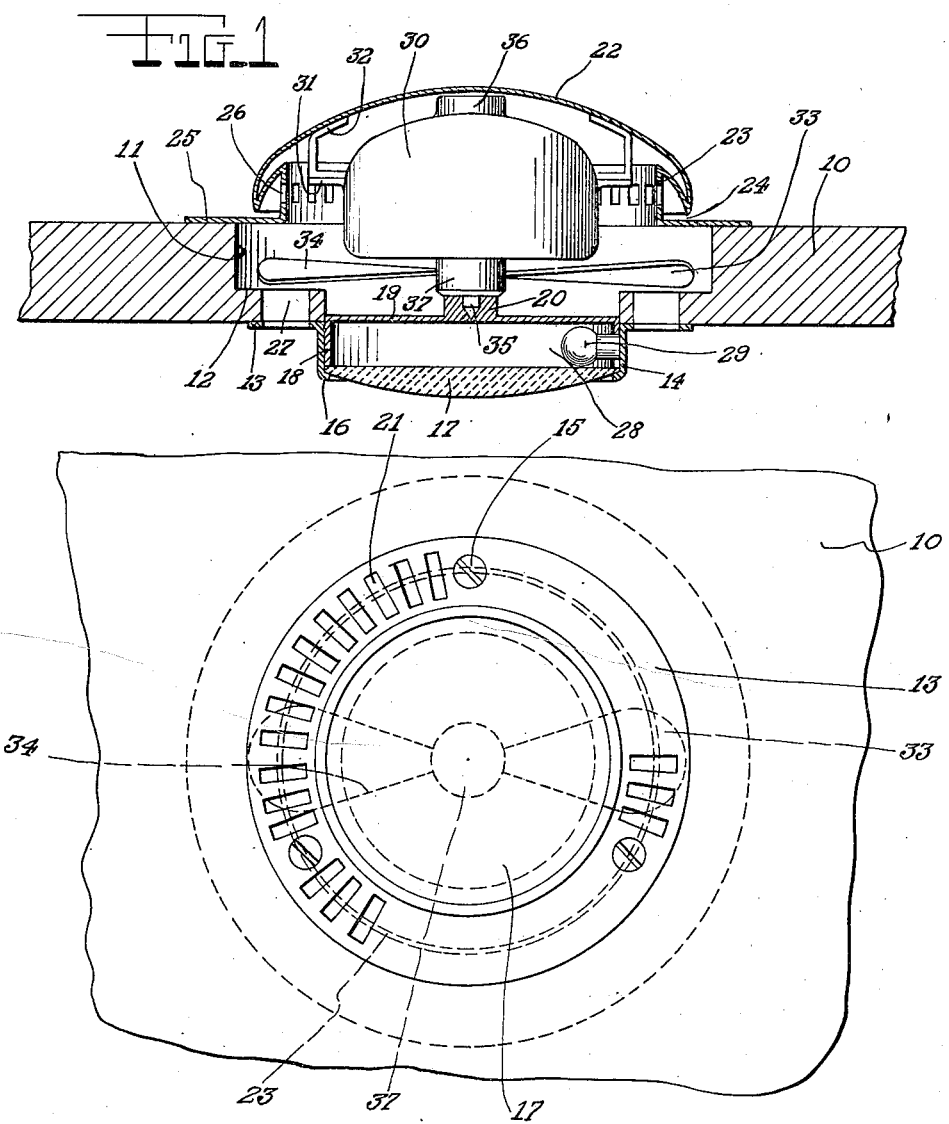
INVENTOR
J.H.Roethel
BY
ATTORNEY Patented July 30, 1929.

1,722,824

UNITED STATES PATENT OFFICE.

JOHN H. ROETHEL, OF BROOKLYN, NEW YORK.

AUTOMOBILE VENTILATING DEVICE.

Application filed August 27, 1926. Serial No. 131,910.

The invention relates to a ventilating device to be installed in an opening in the roof of an enclosed car, and more particularly to a motor driven fan ventilator whereby air can be positively exhausted from or forced into the interior of the body without dependence upon draft produced by motion of the car. The objects of the invention are to provide a very efficient device of this character, and one which provides for escape or ingress of air through and outwardly of the top of the roof, while guarding against the entrance of water, and one which permits the motor and fan to be accommodated within and above the roof opening, and above or substantially above the bottom line of the roof, and one which also provides in the same fixture for a roof light, the whole being constructed and supported very compactly and solidly, so that the same opening in the roof is utilized advantageously for the foregoing essential purposes, without giving rise to any substantial projection into the interior of the car.

The above and other objects will become apparent in the description below in which characters of reference refer to like-named parts in the drawing.

Referring briefly to the drawing, Figure 1 is a vertical section illustrating the construction of the device and its manner of mounting in the roof of the body of the car.

Figure 2 is a bottom plan view of the apparatus as seen from within the interior of the car.

Referring in detail to the drawing, the numeral 10 indicates the roof of the tonneau or the body mounted upon a vehicle chassis, this roof having a thickness approximately as shown. This roof is provided with a relatively large opening 11 in which an internal flange 12 may be formed. Said opening passes entirely thru the thickness of the roof and receives part of the ventilating mechanism. The lower open end of the opening is covered by a cap or plate consisting of an encircling flange 13 which is integral with a circular inner rim 14 having a beaded lower edge 16 on which the peripheral edge of a lens or glass 17 is seated. The flange 13 of the cap is provided with openings thru which screws 15 pass, the latter securing the cap to the under side of the roof of the vehicle. The lens has seated upon it the rim 18 of a drum which is provided with a circular top 19 on which an axial lug 20 is formed. Around the entire periphery of the flange 13 a plurality of radial slots 21 are formed thru which air may enter into the opening 11 from the closed body of the vehicle, or may pass from the opening into the interior of the body.

The upper portion of the roof opening is entirely covered by a dome 22 which surmounts and is integral with an annular supporting wall 23. The lower edge of the dome projects below the upper edge of the wall 23 and this edge of the dome is separated by a gap 24 of small dimension, from the upper surface of a seating plate or flange 25 which latter is formed integral with the dome and wall, the three members being of unitary construction. The wall 23 of the dome is perforated around its entire surface by a plurality of upright rectangular vents 26 thru which the air is adapted to freely circulate when passing from the slots 21 thru the channels 27 and thence thru the opening, or in the reverse direction.

A compartment 28 is formed between the lens 17 and the roof 19 of the drum. Said compartment receives a filament lamp 29 which is mounted on the wall or rim of the drum, and whose circuit is opened or closed by a switch mounted on the dashboard of the vehicle.

The enclosed and protected chamber formed by the dome and the roof opening house a motor casing 30. The latter is provided with a pair of projecting ears 31 to which are attached the ends of straps, said straps or brackets being secured to the underside of the roof of the dome by rivets or other similar means, the straps being indicated by the numeral 32. The motor casing harbors an armature (not shown on the drawing), from one face of which a hub 37 projects downwardly. Said hub is provided with a pair of fan blades 33 and 34 which extend radially outward and are bent to form a shallow pitch. The conical tip 35 of a spindle extends axially from the hub and fits into a socket formed in the lug 20, which latter serves as a journal for one end of the armature. The opposite end of the armature spindle is journalled in the hub 36 which projects from the top of the motor casing and is integral with the latter. The motor may be connected in an electrical circuit equipped with a switch which is preferably mounted on the dashboard of the vehicle.

The device is so constructed that minimum difficulty is encountered in the assembly. The annular plate 25 of the dome is mounted on the surface of the roof to entirely cover the roof opening 11. In fixing the device in place the bottom ventilating cover containing the central light is first mounted in place and after this adjustment has been completed, the armature is removed from the motor casing and the conical tip 35 of its spindle is then inserted into the socket of the lug 20. The motor casing having been previously secured to the roof of the dome 22, the entire upper portion of the device may then be fixed into place by attaching the dome over the opening so that the opposite end of the armature spindle may be inserted into the opening provided in the hub 36 of the motor casing.

By energizing the motor the spindle and the armature is rotated, transmitting rotation to the fan blades 33 and 34. Rotation of the latter draws air thru the slots 21, channels 27, then thru the orifice 11 and the air then finally emerges thru the openings 26 into the atmosphere. In this manner the used and impure air may be entirely exhausted from the compartment in a closed body such as is used for passengers on automobiles at any time it may be willed. The switch for actuating the motor may be installed on the dashboard, which position would be convenient for the operator to manipulate, or in the compartment of the body itself, convenient for manipulation by passengers. By equipping the device with reversible type of motor the ventilator device may serve the two-fold purpose of alternately exhausting or replenishing a room with air.

It will be seen that the plan of the invention provides for protective enclosure of the motor and fan within the ventilating dome and the roof opening, the motor being partly within the hollow of the dome above the roof, and partly within the thickness of the roof, the fan lying within the opening and above the bottom ventilating cap, the fan parts as a whole being above the bottom line of the roof, so that, notwithstanding the incorporation of the ceiling light in the fixture in line beneath the motor and fan, the amount of projection into the interior of the car body is only slight. The motor notwithstanding its elevated position is well protected by its housing and the ventilating dome with its guarded passages, which are also designed to exclude water from the interior of the automobile body. The supporting of the motor casing from the upper part of the device, and the support which the motor thus derives, are also characteristic features.

It is to be noted that certain changes in form and construction may be made without departing from the spirit and scope of the invention.

I claim:

1. A ventilating device for the roof of an automobile body which is provided with an opening through it, said device comprising a low ventilating dome mounted over the roof opening, and an electric fan motor lying partly within said ventilating dome and partly in the roof opening with a support in the dome, and a fan driven by said motor and lying in the roof opening.

2. A ventilating device for the roof of an automobile body which is provided with an opening through it, said device comprising a low ventilating dome mounted over the roof opening, an electric motor and a fan driven by said motor supported in the device with the motor partly within the dome and partly within the roof opening and the fan lying in the roof opening.

3. A ventilating device for the roof of an automobile body which is provided with an opening through it, said device comprising a low ventilating dome mounted over the roof opening, a motor housing beneath the top of said dome and lying partly within the dome and partly within the roof opening, a support connecting the motor housing to the dome, an electric motor in said housing, and a fan connected to said motor and lying within said roof opening.

4. A ventilating device for the roof of an automobile body which is provided with an opening through it, said device comprising a low ventilating dome mounted over the roof opening, a ventilating plate covering the bottom of the roof opening, a motor housing within the dome and connected therewith, said motor housing lying partly within the dome and partly within the roof opening, an electric motor in the housing, and a fan connected to said motor and lying within the roof opening.

5. A ventilating device for the roof of an automobile body which is provided with an opening through it, said device comprising a low ventilating dome mounted over the roof opening, said dome having a peripheral skirt with circuitous ventilating passages between the lower edge of said skirt and the roof opening, a ventilating bottom cap for the roof opening, an electric fan motor and fan between said dome and bottom cap, a housing for the motor, and brackets securing said motor housing to the under side of the dome.

6. A ventilating device for the roof of an automobile body which is provided with an opening through it, said device comprising a ventilating dome mounted over the roof opening, said dome having a skirt, an apertured wall guarded by said skirt and an attaching flange extending outward from the lower portion of said wall, all formed in one continuous piece, fan motor and a fan beneath said dome, and a ventilating cap for the bottom of the roof opening.

7. A ventilating device for the roof of an automobile body which is provided with an opening through it, said device comprising a low ventilating dome mounted over the roof opening, an electric motor and a fan driven by said motor supported in the device with the motor partly within the dome and partly within the roof opening and the fan lying in the roof opening, and a ventilating plate covering the bottom of the roof opening.

In testimony whereof I affix my signature.

JOHN H. ROETHEL.